United States Patent [19]
Huang

[11] Patent Number: 5,692,554
[45] Date of Patent: Dec. 2, 1997

[54] FOLDING SUNSHIELD

[76] Inventor: Robert Huang, 1180 Wellington Ave., Pasadena, Calif. 91103

[21] Appl. No.: 707,138

[22] Filed: Sep. 3, 1996

[51] Int. Cl.$^6$ ................................................. B60J 3/00
[52] U.S. Cl. ........................... 160/370.23; 160/DIG. 3
[58] Field of Search ................... 160/370.23, 84.04, 160/DIG. 2, DIG. 3; 296/97.7, 97.8, 97.1

[56] References Cited

U.S. PATENT DOCUMENTS

| | | |
|---|---|---|
| 2,599,066 | 6/1952 | Osborn . |
| 4,202,396 | 5/1980 | Levy . |
| 4,652,039 | 3/1987 | Richards ................... 160/370.23 X |
| 4,671,334 | 6/1987 | Yadegar et al. . |
| 4,727,920 | 3/1988 | Siegler ........................ 160/84.04 |
| 4,763,947 | 8/1988 | Gregg ......................... 160/370.23 |
| 4,777,994 | 10/1988 | Nederveld ................... 160/84.04 |
| 4,805,955 | 2/1989 | Levy . |
| 4,848,825 | 7/1989 | Niernberger . |
| 4,861,090 | 8/1989 | Gavrieli . |
| 4,877,074 | 10/1989 | Castellano ................. 160/370.23 X |
| 4,923,239 | 5/1990 | Wischusen et al. ....... 160/370.23 X |
| 4,974,655 | 12/1990 | Teachout ................... 160/370.23 X |
| 5,267,599 | 12/1993 | Kim . |
| 5,324,090 | 6/1994 | Lehnhoff .................. 160/370.23 X |

*Primary Examiner*—David M. Purol
*Attorney, Agent, or Firm*—Burns, Doane, Swecker & Mathis, L.L.P.

[57] ABSTRACT

A folding sunshield is comprised of adjacent, panels which fold along their adjacent, long sides. There are two central panels whose opposing sides converge either toward the top or the bottom of the sunshield, adapting the sunshield to fit the shape of an automobile windshield. The overall shape of the sunshield is narrower at the top edge than at the bottom edge. In the folded position, the sunshield panels lie superimposed, but not necessarily congruent.

13 Claims, 7 Drawing Sheets

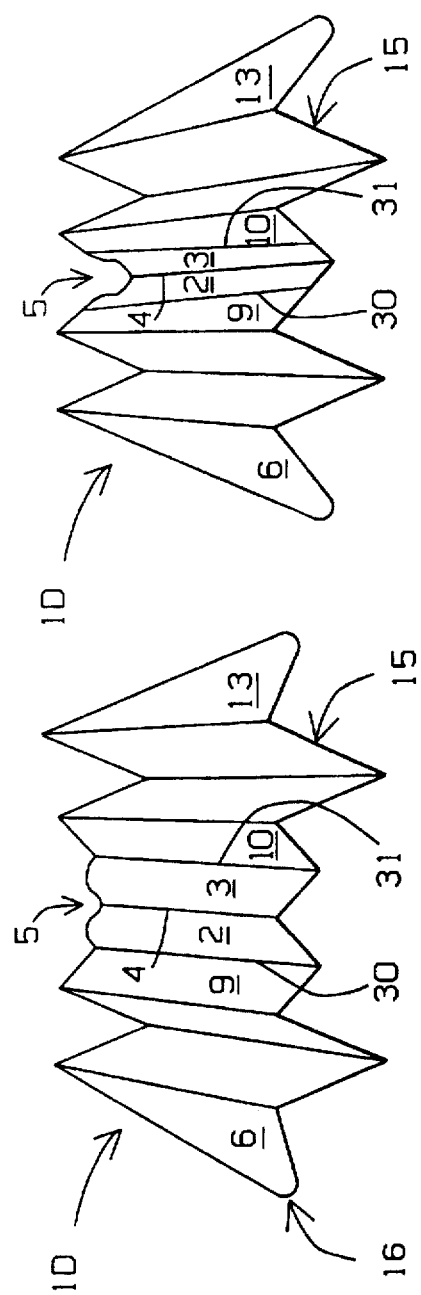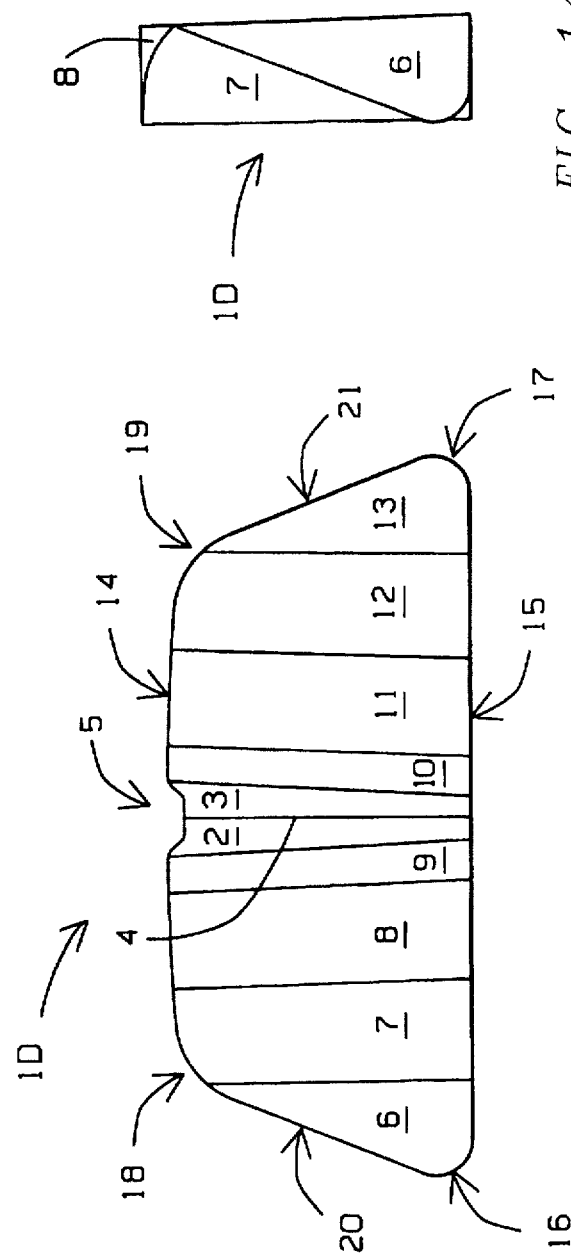

FOLDING SUNSHIELD

This invention is a folding sunshield having a plurality of elongate panels which are joined together along their elongate sides. It is primarily useful as a sunshield for the windshield of a vehicle, although it may be used on side windows and rear windows of vehicles or windows in buildings and in other places wherever a sunshield is needed.

The sunshield of the invention folds accordion-like, although it may be designed to fold additionally in other ways. It is, preferably, self-supporting by being made of a rigid or semi-rigid material. However, suction cups, magnets, Velcro or sticky film, such as polyethylene, tabs and other means, may be attached to the sunshield and used to support the sunshield in place if the sunshield is constructed of material which has insufficient strength to hold itself upright. Such suction cups, Velcro, sticky film, pennants, tab extensions and other means may be used even in those cases where the sunshield has sufficient strength but attachment to the windshield or its surrounding structure is desired. Also, the sunshield may obtain some support from being held up by the rear view mirror structure, the sun visors or the window frame or any combination of them. The preferred embodiment is a sunshield made of a semi-rigid material which substantially supports itself upright, but which may rest against the sun visors.

PRIOR ART

Prior art folding sunshields for vehicles have planar, rectangular panels which are hinged together and which are readily folded for storage and unfolded for use. The panels are made of a rigid or semi-rigid sheet material. An example of such sunshield in the prior art is U.S. Pat. No. 4,202,396, issued May 13, 1980, to Abraham Levy.

Another example is U.S. Pat. No. 4,848,825, issued Jul. 18, 1989, to Clyde Niernberger which shows a folding rectangular windshield cover.

Still another example of prior art is U.S. Pat. No. 5,267,599 issued Dec. 7, 1993 to Ki I. Kim. That patent teaches a folding sunshield comprised of a foam material having rectangular panels created by creasing the material successively on alternate sides.

U.S. Pat. No. 2,599,066, issued Dec. 11, 1950 to E. B. Osborn teaches a windshield cover for automobiles. The cover is comprised of elongated, rectangular, fabric panels which can be easily rolled or folded into a small, compact bundle for storage.

A fan-type sunshield is taught in U.S. Pat. No. 4,861,090, to Gavrieli, for Fan-Type Automobile Window Shade, issued Aug. 29, 1989. That window shade is a fan which uses a plurality of slats connected at the support end.

U.S. Pat. No. 4,671,334 for Vehicular Sunshade, issued Jun. 9, 1987 to George Yadegar and Parvaneh Y. Aframian, show essentially rectangular panels, but describes them as "substantially trapeziform", Col. 3, line 28 et seq. Yadegar and Parvaneh teach and suggest rectangular or near-rectangular panels which are all the same.

BRIEF SUMMARY OF THE INVENTION

The prior art folding sunshields are not well-fitted to the inside of the windshields of the newer model automobiles. The upper width of the newer automobile windshields are much narrower at the top than at the bottom. The previously-used rectangular panels or near-rectangular panels do not fit such new windshields. So the sunshield of the invention is designed to be substantially narrower at the top than at the bottom. The device of the invention is a folding sunshield which is better constructed to fit the shape, inside the automobile, of most of the newer automobile windshields or windshields of other vehicles. The top and bottom edges of the sunshield of the invention are approximately parallel and the left and right sides of the sunshield converge toward each other. All or some of such edges and sides may be somewhat curved and, are, preferably, rounded at the corners. The sunshield of the invention is designed specifically for use inside the automobile to fit the windshield, but it may also be used to fit outside the automobile over the windshield or other window. To use the sunshield on the outside of an automobile, there may be included, as part of the sunshield or independently thereof, straps, cords, suction cups, magnets, "rip-off spoilers" and other means, as taught in the prior art, such as Osborn and Niernberger which are referred to above.

The invention lies in constructing a sunshield of elongate panels which are joined to each other along their longer sides, so that when such sunshield is folded, the panels still lie superimposed. This is accomplished by having at least two centrally-located panels which converge more than the remainder of the panels. In some embodiments, some of the panels may be rectangular. In the preferred embodiment, none of the panels are rectangular, still, when folded, the panels are substantially superimposed, although they may or may not be congruent. This is not easily done. Nevertheless, it has been found that it can be done through the use of centrally-located panels whose elongated sides converge more rapidly than the remainder of the panels. Ordinarily, such shaped panels, which are not rectangular or nearly rectangular, cause the sunshield to have "dog ears", comprised of the corners of underlying panels, extending out to one or both sides. However, utilizing suitably-converging, centrally-located panels can keep the underlying panels substantially within the outer panels or the outer two panels, when the sunshield is folded, so that the underlying panels are unobtrusive and do not detract from the appearance and the aesthetics of the sunshield in its package or in its folded state. This feature is also functional in that the sunshield can be folded and packaged to provide a uniform appearance and by having no "dog ears" extending to the sides when folded, the sunshield is easier to package or shrinkwrap. Also, there is less likelihood of damage to the sunshield in handling, while still wrapped in its package or throughout its life, because there are no portions protruding out to the side of the sunshield when it is folded.

It is, therefore, an object of this invention to provide a folding sunshield which is narrower at the top than at the bottom.

It is also an object of this invention to provide a folding sunshield constructed of a number of panels, of which the fold lines along the sides of centrally-located panels converge.

Another object of this invention is to provide a folding sunshield having panels which are readily folded.

A further object of this invention to construct such sunshield of elongate panels joined along their longer sides.

It is a further object of this invention is to construct a folding sunshield having panels, which panels are superimposed when the sunshield is folded.

A still further object of this invention is to construct such sunshield so that it folds without "dog ears" extending to either side of such sunshield.

BRIEF DESCRIPTION OF THE DRAWINGS

Further objects and features will become apparent from the following drawings and description in which:

FIG. 13 is another embodiment of the sunshield in which the outer panels are almost triangular in form and in which four central panels are quite narrow.

FIG. 14 is a side view of the embodiment of FIG. 13, in its folded state.

FIG. 15 is a perspective view looking toward the bottom edge of the embodiment of FIG. 13, folded in one manner.

FIG. 16 is a perspective view looking toward the bottom edge of the embodiment of FIG. 13, folded to form only 8 panels.

DETAILED DESCRIPTION

Figure 1:
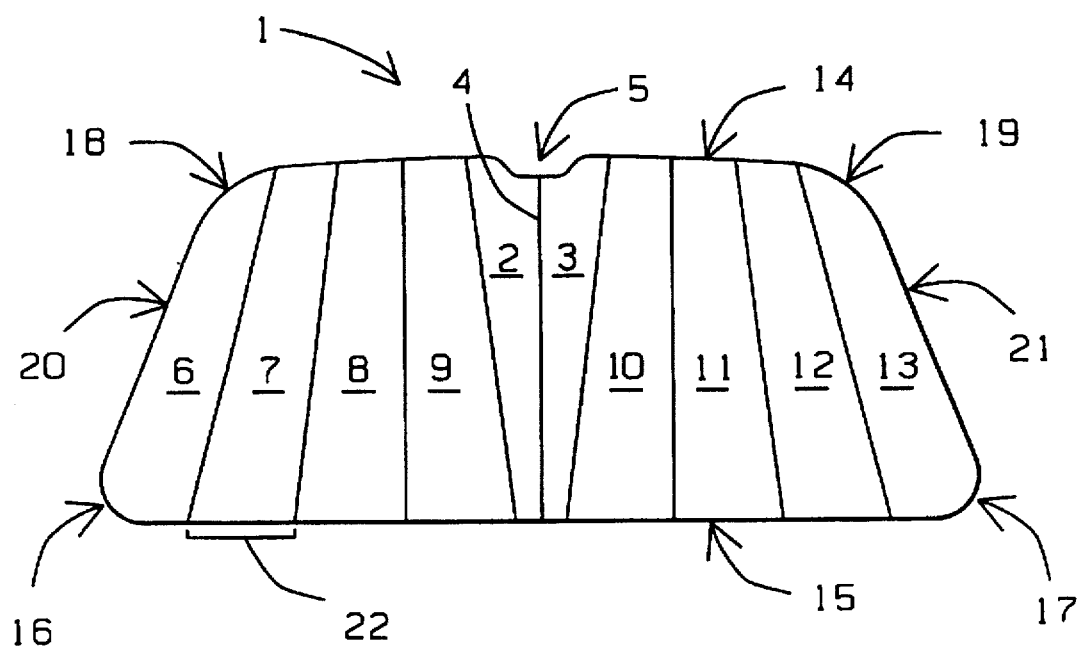
FIG. 1 is a front view of the first preferred embodiment of the sunshield of the invention in its unfolded state, in which two central panels converge toward the bottom edge of the sunshield and the remaining panels converge upwardly.

FIG. 1 is a front view of the preferred embodiment of the folding sunshield 1 of the invention, in its unfolded state. The material of which the sunshield is made may be cardboard, foam made of plastic or other material, fiberglass, bubble plastics, polyvinylchloride, polystyrene, polytetraethylene, vinyl, acrylic, Mylar, aluminized Mylar or various other plastics, cellulose or other material. One preferred material is an aluminized Mylar on a bubble plastic backing. It is to be appreciated that the sunshield may be of one or more layers of material which may be treated or untreated for special purposes. Various paints or layers may be added to provide colorizer, ultraviolet filter, reflection, heat insulation or any combination of such features or other features. Silver is one particularly utilized material, particularly metallic silver painted on Mylar, which may or may not be adhered to a plastic foam, a bubble plastic or other material. Aluminum evaporated on a suitable backing is also sometimes used as a reflector in sunshields. The sunshield material may be opaque or translucent. The sunshield material is foldable along lines, preferably made in advance of folding, by creasing. Such fold lines create hinged panels in the sunshield material. Such panels are hinged together by the fold lines. Of course, such sunshield and its panels may be constructed in other ways, such as by constructing each panel and adhering them along their longitudinal sides to adjacent panels. Another method is to construct a plastic cover having insert pockets into which panels are inserted. Such method could provide particularly effective heat insulation properties, depending on the material used in the panels and the plastic cover.

It is noted that ten panels, 2 and 3, and 6 through 13 are illustrated in FIG. 1. More or less panels may be used than shown. If additional panels are used, some adjustment may have to be made to achieve good superposition of the panels of the sunshield in its folded state. Additional panels may be obtained by extending the width of the sunshield or by making each of the panels smaller. One simple way of extending the width is to add a rectangular panel on each side of the windshield, but not as the outer panels. One way to increase the numbers of panels would be to divide larger panels in half by a fold line extending from the top edge 14 of the sunshield to the bottom edge 15 of the sunshield.

Creasing the sunshield material is the preferred form of creating, or forming, the panels and it is preferred that the creasing be done on alternate sides, so that each sunshield panel folds in the alternate direction from the panel next to it, as is common in the prior art. However, as will be explained hereafter, in connection with FIGS. 7 and 8, creasing may be accomplished on a single side. Also, it is to be appreciated that the creases may be "V"-shaped, "U" shaped, double-width shaped, wing-shaped, double-wing-shaped or otherwise shaped.

In FIG. 1, panels 2 and 3 are located centrally, on each side of center line 4, that is, they are "centrally-located". Center line 4 is also a fold line so it, too, is creased. It is noted that such panels converge or get narrower toward the bottom edge 15 of the sunshield in this embodiment. Such panels 2 and 3 are substantially narrower at said bottom edge 15 than the adjacent panels 9 and 10 at such bottom edge 15. The longitudinal sides of each of the panels 6 to 9 and 10 to 13 converge toward each other toward the top edge 14 of the sunshield.

A portion of the sunshield 1 may be removed to form cutout 5 which prevents the rear view mirror and its support from interfering with the sunshield and vice versa.

The panels 6 to 9 are located on one side of the central panels 2 and 3 and the remaining panels 10 to 13 are located on the other side of central panels 2 and 3. The fold lines between panels 6 and 7, 7 and 8, 8 and 9, etc., can be seen to define the panels, as well as provide a hinge between the panels so that the sunshield can be readily folded. It is noted that top edge 14 is slightly curved downwardly toward the sides of the sunshield. This is the preferred shape, although top edge 14 could be quite straight. Such top edge 14 is approximately parallel to bottom edge 15 which is fairly straight. Sides 20 and 21 converge toward each other upwardly. The overall shape of the sunshield is defined by top and bottom edges 14 and 15 and left and right sides 20 and 21, respectively, together with their corners 16, 17, 18 and 19.

The lines forming corners 16 and 17 are acute angles and are rounded, or curved. The lines forming corners 18 and 19 are obtuse angles and are also curved, but more gradually than are corners 16 and 17. These corners and their acute and obtuse angles are selected to approximately fit, the automobile windshield or other window involved. In any event, the sunshield is narrower at the top than at the bottom. That is, the length of the sunshield along its top edge 14 is less than the length of the sunshield along its bottom edge 15.

Panels 7, 8 and 9, and panels 10, 11 and 12 have their top and bottom edges parallel, or preferably, not quite parallel because of the preferred curvature of the top edge 14.

In FIG. 1, it is noted that the bottom edges of all of the panels, are all equal or nearly equal, except for the bottom edges of panels 2 and 3, which are shorter than the rest. However, the top edges of all of the panels, including panels 2 and 3 are all equal or nearly equal. Thus, as may be seen by reference to FIG. 5, when folded, all panels of sunshield 1 are superimposed and somewhat congruent, except for panels 2 and 3.

Figure 2:
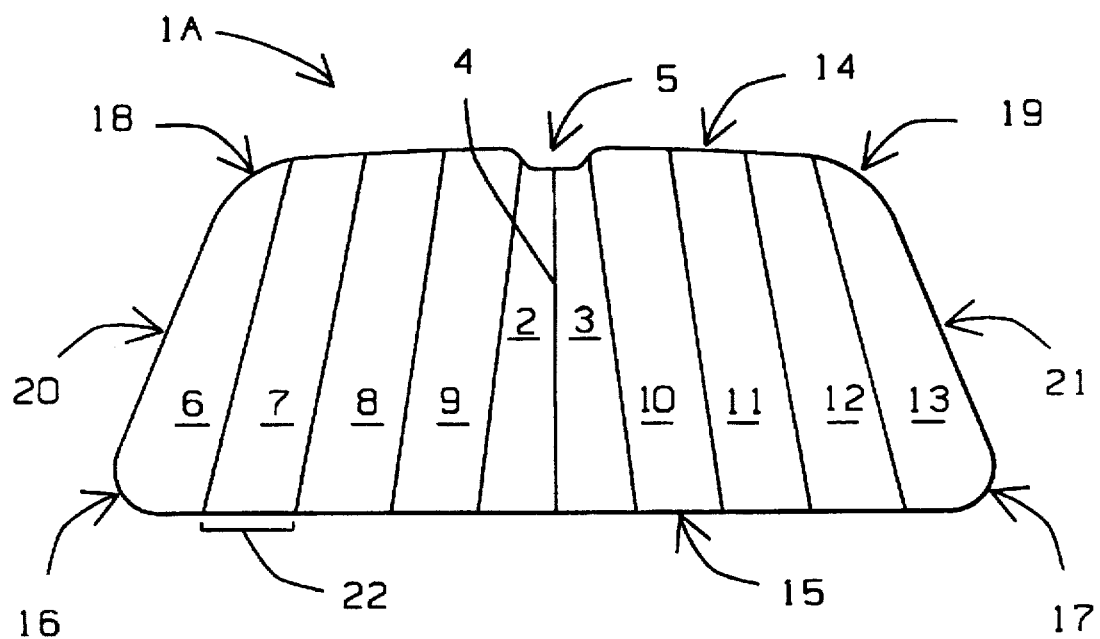
FIG. 2 is a front view of a second preferred embodiment of the sunshield of the invention in its unfolded state, in which two central panels converge toward the top edge of the sunshield. In this embodiment, the other panels are also illustrated as converging toward the top edge of the sunshield.

FIG. 2 is a front view of a second preferred embodiment of the sunshield, designated as sunshield 1A, in its unfolded state. In this embodiment, it is noted there are still two panels 2 and 3, centrally-located on each side of center line 4. However, in this embodiment, panels 2 and 3 converge toward the top edge 14 of the sunshield 1A. That is, panels 2 and 3 are narrower at their top edges than at their bottom edges. Thus, panels 2 and 3 are substantially narrower at the top edge 14 of the sunshield than are adjacent panels 9 and 10 at such top edge 14.

It is noted that panels 7 through 12 are shaped quite like parallelograms. The sides of each of the panels 7, 8, 9, 10, 11 and 12 are shown as converging slightly. Alternatively, each of such panels could be constructed to have sides which are substantially parallel or parallel to the other side of the panel. The end panels 6 and 13 are curved at their corners 16, 17, 18 and 19. Thus, the outline of the sunshield is shaped overall to fit the perimeter of a windshield inside the automobile. Desired alterations in the outline may be made at specific locations in order to accommodate the rear view mirror, sun visors or other automobile accessories or for other reasons.

In FIG. 2, the corners 16, 17, 18 and 19, top and bottom edges 14 and 15 as well as left and right sides 20 and 21 are located pretty much the same as in FIG. 1, giving the sunshield 1A, of FIG. 2, the same outline as the sunshield 1 of FIG. 1.

The embodiment of sunshield 1A shown in FIG. 2 is shown folded in FIG. 6 and will be discussed hereafter.

Figure 3:
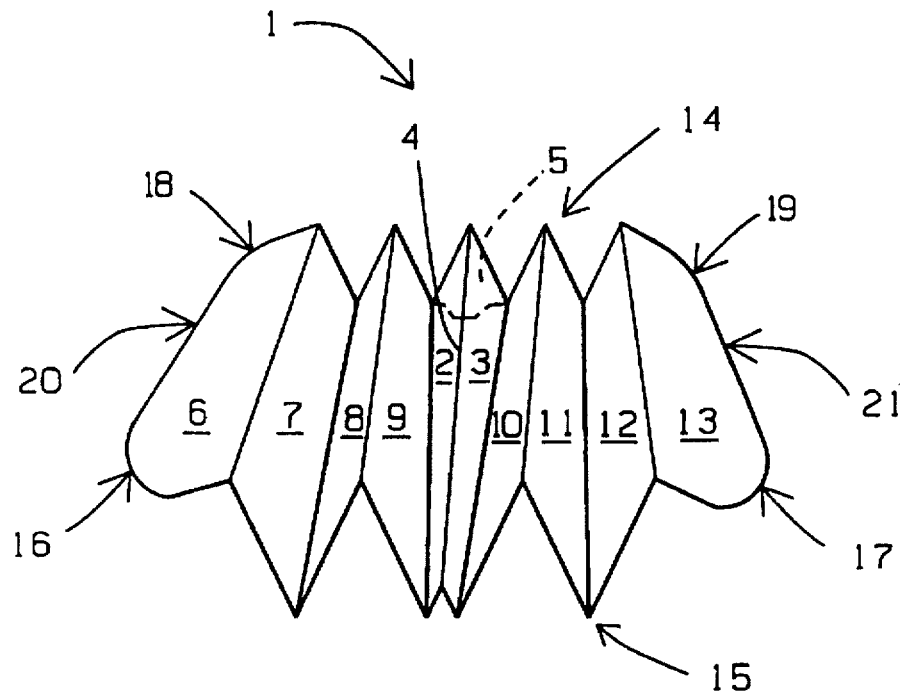
FIG. 3 is a perspective, looking toward the bottom end of the sunshield embodiment of FIG. 1, in a partially-folded state.

FIG. 3 is a perspective of the sunshield 1, of FIG. 1, looking toward the bottom edge 15 of the embodiment of FIG. 1. The sunshield 1 is shown partially-folded. Cutout 5 is shown in dotted lines. As can be seen, panels 2 and 3, at their top ends, are pretty much as wide as each of the remaining panels. However, panels 2 and 3, at their bottom ends, are each much narrower than the width of each of the remaining panels at their bottom ends. Thus, panels 6, 7, 8 and 9 and panels 10, 11, 12 and 13, when folded, lie fairly congruently with each other. It is noted that panels 6 and 13, the outside panels are curved at their corners 16, 17, 18 and 19 and, thus, do not lie congruently, at those curved corners, with the other panels which have no curved corners.

Figure 4:
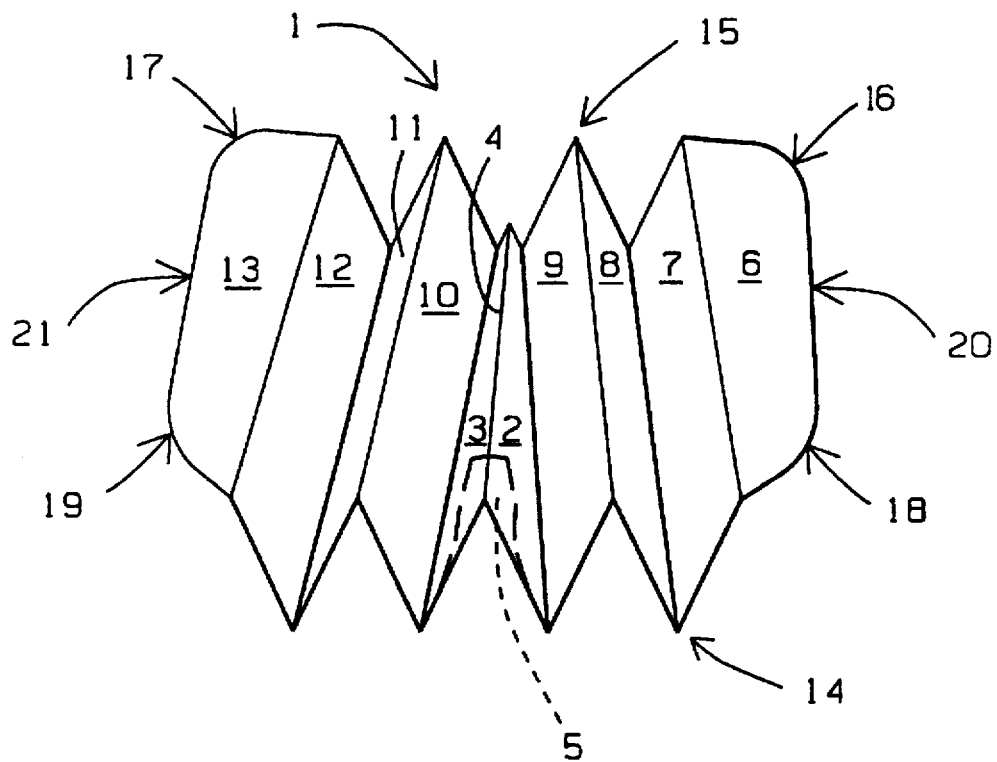
FIG. 4 is a perspective, looking toward the top end of the sunshield embodiment of FIG. 1, in a partially-folded state.

FIG. 4 is a perspective, looking toward the top end 14 of the embodiment of FIG. 1. It can also be seen From FIG. 4 how the panels fold together, accordion-wise, on top of each other. Looking at the sunshield from this end, it is easily seen how the panels at this end of the sunshield lie congruently above those below it, when folded.

Figure 5:
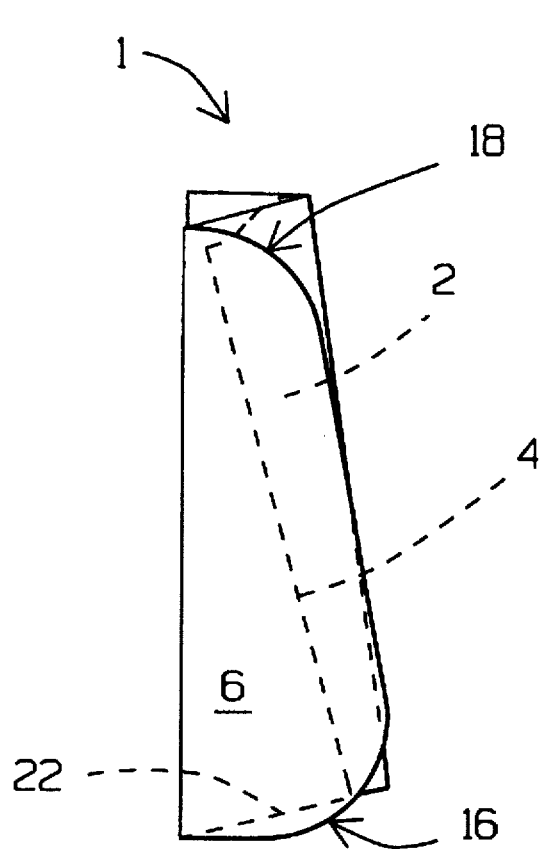
FIG. 5 is a side view of the preferred sunshield embodiment of FIG. 1 in its folded state.

Each of the embodiments herein may be folded in similar fashion. That is, each panel is folded in the opposite direction from the panel preceding it. FIG. 5 is a side view of the sunshield 1 of FIG. 1, in its folded state. This is the preferred embodiment. It is seen that panel 6 is at the front, with the other panels behind it. In this embodiment, it will be recalled that the centrally-located panels 2 and 3 converge toward the bottom of the sunshield 1. Center line 4 is seen extending downwardly to the right, where the panels 2 and 3 converge. Thus, panels 2 and 3 lie substantially along the right side of the folded sunshield 1. The bottom edge 22 of panel 7, which underlies panel 6, lies fairly close to the bottom edge of panel 6. Such bottom edge 22 may even be visible for a short distance, as shown in Pig. 5. It may be seen that when the sunshield is folded, the inner panels lie fairly well concealed under the outer panels except at the top of the sunshield, where the inner panels extend slightly above the outer panels. It is understood that ties, magnets, Velcro, elastic bands or other means, whether attached to said sunshield or independent thereof, may be used to hold such sunshields in their folded state.

Figure 6:
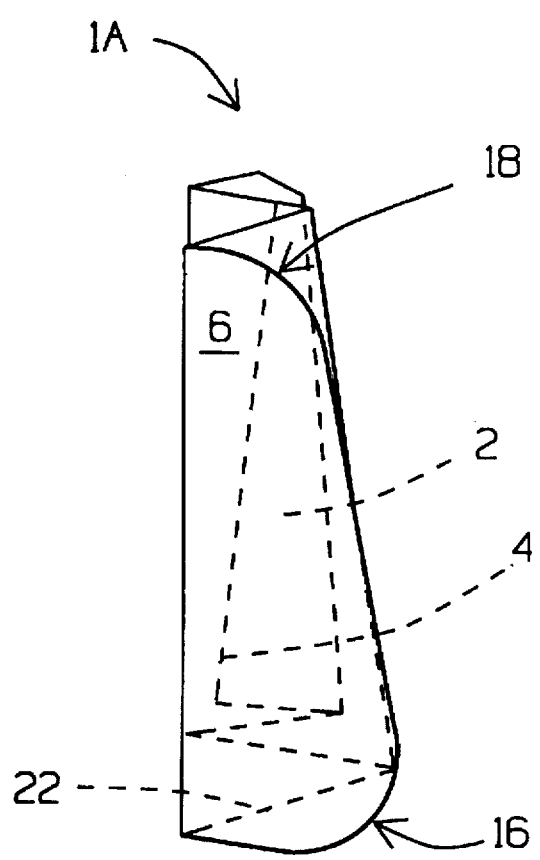
FIG. 6 is a side view of the second preferred sunshield embodiment of FIG. 2 in its folded state.

FIG. 6 is a side view of the sunshield 1A of FIG. 2 in its folded state. This is the second preferred embodiment. In this embodiment, it is to be recalled that the panels 2 and 3 converge upwardly. Thus, center line 4 is seen extending upwardly to the right, where the panels 2 and 3 converge. In this embodiment, bottom edge 22 of panel 7 extends somewhat upwardly to the right, yet the bottom portion of panel 7 lies well-concealed under panel 6.

Figure 7:
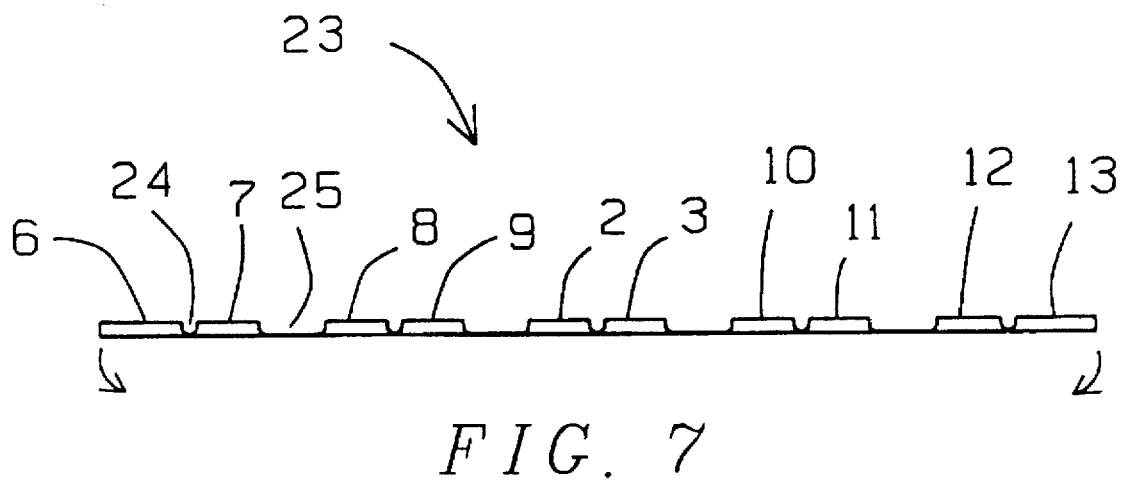
FIG. 7 illustrates how the folding sunshield may be made with all creases on a single side.

FIG. 7 illustrates how the folding sunshield material 23 may be made with all creases on a single side. Preferably, the sunshield panels are folded in accordance with the previous description, in alternate directions. Prior art teaches how the creases may be made on alternate sides of the material of a folding sunshield. That is the customary practice. In FIG. 7, the sunshield material is creased on a single side. Crease 24 allows panel 6 to fold downwardly. Likewise, panel 13 folds downwardly. The panel widths and the crease widths are not drawn to scale, but are substantially enlarged in order to better illustrate the creases. That is, the panel widths are shown narrower than they would actually be, relative to the widths of the creases, and the creases are shown wider than they would actually be relative to the panel widths. Crease 25, which may or may not be double wide, depending on the material involved, and the width of the material involved. Such crease 25 allows the panel 7 to fold over on top of panel 8. Panel 8 and all preceding panels fold downwardly under and onto panel 9 which then folds upwardly over panel 2. Panel 2, in turn, folds downwardly and under panel 3. The folding continues in that manner. This manner of creasing would allow the sunshield panels to be folded twice in the same direction inasmuch as alternate creases are wider.

Figure 8:
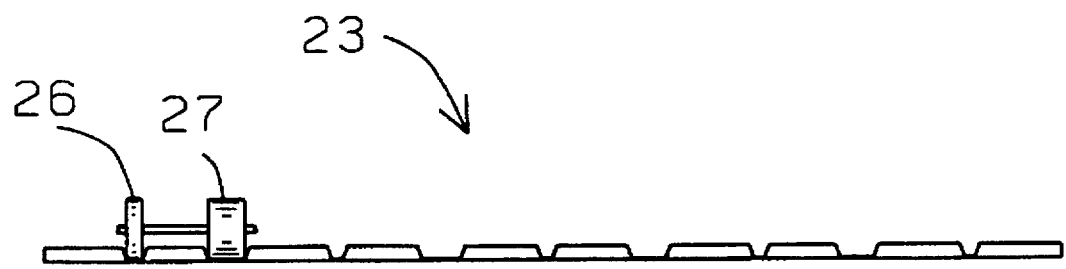
FIG. 8 illustrates creasing on a single side using two creasing rollers.

FIG. 8 illustrates creasing sunshield material 23 on a single side using two creasing rollers 26 and 27, having differing widths. Numerous rollers could be used or a single pair. Further, a single roller could be used, making two passes, side by side, for wider creases, where desired. Heat creasing is also used in the prior art. Heated crease blocks which are long and are simply pressed into the material may be used, or traveling crease blocks which move along the material may be used. Rods, wires and other structures may be used for creasing. It is pointed out, again, that the creases may be of various shapes, "V", "U", double wide or of still other shape.

It is noted, too, that some materials will not require some creases to be wider than other creases, but that all creases may be the same width.

Figure 9:
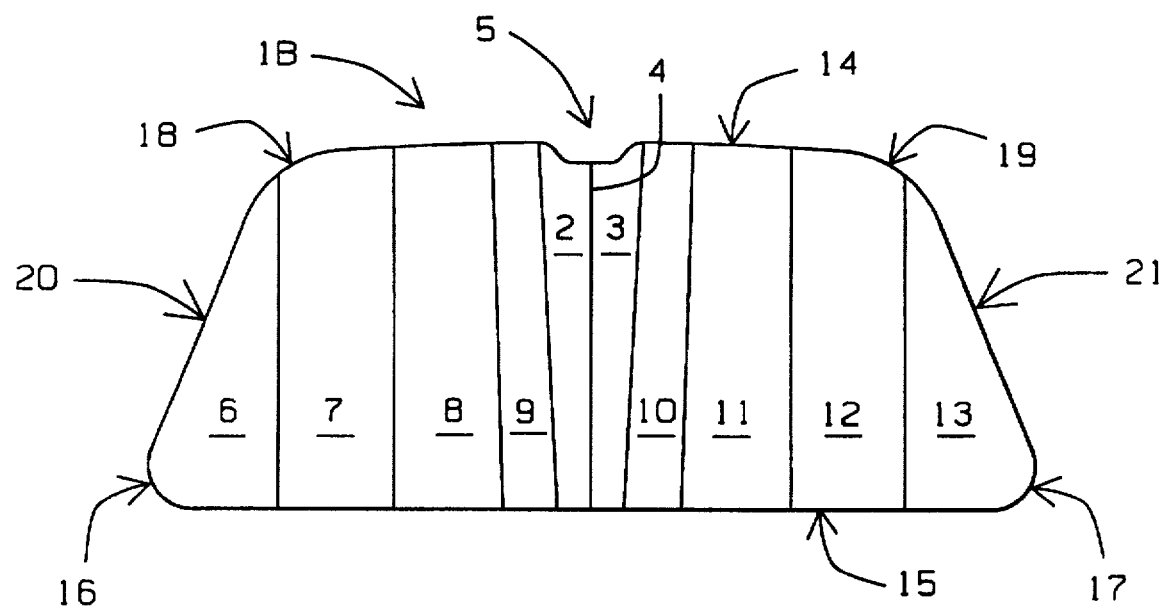
FIG. 9 is a front view of another embodiment of the sunshield, in which the outer panels are slightly narrower than in other embodiments.

FIG. 9 is a front view of another embodiment 1B of the sunshield, in which the outer panels 6 and 13 are slightly narrower than in other embodiments. It is noted that the fold lines, which define or create panels 2 and 3, converge upwardly. Panels 7, 8, 9, 10, 11 and 12 are approximately parallelograms.

Figure 10:
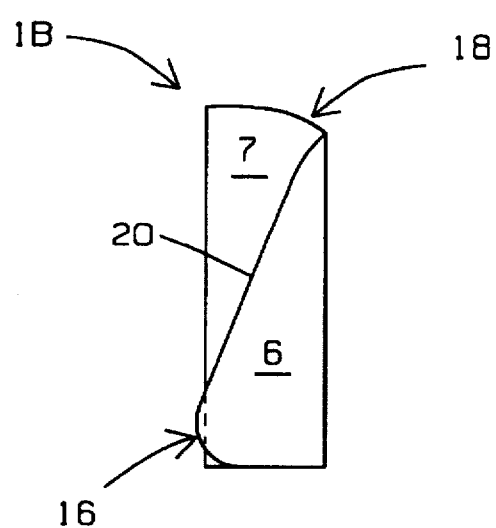
FIG. 10 is a side view of the embodiment of FIG. 9, in its folded state.

FIG. 10 is a side view of the embodiment of FIG. 9, in its folded state. Panel 6 lies at the front, overlying panel 7. It may be seen the center line 4 extends downwardly from the left of the sunshield 1B to the right. Not all hidden lines are shown in order to prevent confusion. However, hidden lines 22 and 28, which are the bottom edges of panels 7 and 2, respectively, are illustrated and may be viewed directly in FIG. 9.

Figure 11:
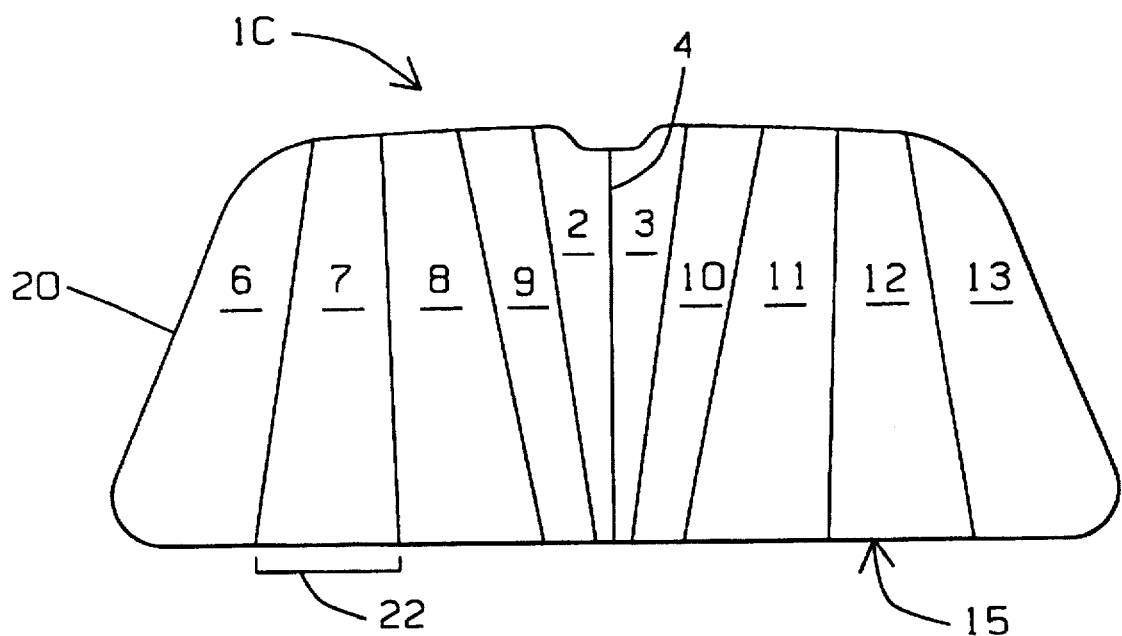
FIG. 11 is another sunshield embodiment in which the sides of four, central panels converge toward the bottom edge of the sunshield.

FIG. 11 is another embodiment 1C of the sunshield in which the sides, or the fold lines, of four, central panels 2, 3, 9 and 10 converge toward the bottom edge 15 of the sunshield 1C. It is noted that the remainder of the panels have sides or fold lines that converge upwardly.

Figure 12:
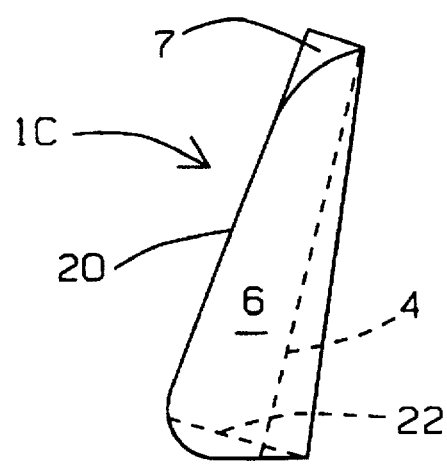
FIG. 12 is a side view of the embodiment of FIG. 11, in its folded state.

FIG. 12 is a side view of the sunshield 1C of FIG. 11, in its folded state. As can be seen, superposition of the panels is fairly well-achieved in this embodiment. Panel 6 lies at the front, followed by panel 7. The bottom edge 22 of panel 7 is shown by a dotted line. Center line 4 may be seen extending downwardly from right to left.

FIG. 13 is another embodiment 1D of the sunshield in which the outer panels 6 and 13 are almost triangular in form and in which four central panels 2, 3, 9 and 10, are quite narrow. The fold lines defining central panels 2 and 3 converge quite definitely toward bottom edge 15 of the sunshield 1D. The fold lines defining panel 9, in this embodiment, are parallel or approximately parallel to each other. The same is true of the fold lines defining panel 10. This sunshield folds as do the others. It would be possible, of course, to fold twice in the same direction. For example, end panel 6 might be folded to fall between panels 7 and 8, provided the crease between panels 7 and 8 is wide enough to permit it, or the sunshield material is flexible enough to allow it. Similarly, panel 13 may be folded to lie between panels 12 and 11.

Any panel whose fold line is approximately vertical in the sunshield may be readily folded either way without changing the folded configuration too drastically.

FIG. 14 is a side view of the embodiment 1D of FIG. 13, in its folded state. Outer panel 6 is somewhat triangular in shape and covers only a part of panel 7. Nevertheless, this is a suitable folding manner for the outer panels. If sunshield 1D outer panel 6 is folded to lie between panels 7 and 8 as described above, then panel 7 will provide the outer appearance of the sunshield instead of the combination of panel 7 and panel 6 as shown in FIG. 14.

FIG. 15 is a perspective view looking toward the bottom edge 15 the embodiment 1D of FIG. 13, folded in one manner wherein the center panels 2 and 3 are folded against their adjacent panels 9 and 10, respectively. This is the manner of folding previously described and shown in FIGS. 3 and 4. Panel 2 folds along fold line 30 against panel 9. Panel 3 folds along fold line 31 against panel 10. This manner of folding will result in the side view shown in FIG. 14. This manner of folding folds the sunshield into 10 panels.

FIG. 16 is a perspective view looking toward the bottom edge 15 of the embodiment 1D of FIG. 13, folded to form only 8 panels. In folding of this sunshield panels 9 and 2 are a single panel and panels 3 and 10 are a single panel. That is, panel 2 is not folded against panel 9, but, rather against panel 3. Panel 9 then is against panel 10. Consequently, fold lines 30 and 31 are not used and are thus the panels are not folded along fold lines 30 and 30, when in the folded state. This manner of folding will also result in the side view shown in FIG. 14. This, then would not require fold line 30 and 31 at all and only 8 panels would be involved. Panel 2 would be merged with panel 9 and panel 3 would be merged with panel 10. The sunshield would still be of the same width when folded. Of course, a center line, or fold line 4, is still required.

Although specific embodiments and certain structural arrangements have been illustrated and described herein, it will be clear to those skilled in the art that various other modifications and embodiments may be made incorporating the spirit and scope of the underlying inventive concepts and that the same are not limited to the particular methods and structure herein shown and described except insofar as determined by the scope of the appended claims.

I claim:

1. A folding sunshield comprised of a plurality of elongate panels, each having opposing long sides and each having top and bottom edges forming the top and bottom edges of said sunshield, and wherein the top edge of said sunshield is substantially shorter than the bottom edge of said sunshield, and wherein said panels are joined along their long sides, and wherein said panels fold against each other along their long sides, at least two of said elongate panels being centrally-located among said elongate panels, and wherein said long sides of said centrally-located panels converge more than the remainder of said panels.

2. The sunshield of claim 1, wherein said long sides of only two of said centrally-located panels, converge toward each other more than the remainder of said panels.

3. The sunshield of claim 1, wherein each said long side of a respective panel converges upwardly toward the opposing side of said panel.

4. The sunshield of claim 1, wherein each said long side of a respective panel, except said centrally-located panels, is approximately parallel with the opposing long side of said respective panel.

5. The sunshield of claim 1, wherein said top edge of said sunshield is slightly curved downwardly toward its ends.

6. The sunshield of claim 5, wherein said bottom edge of said sunshield is substantially straight.

7. The sunshield of claim 1, wherein said long sides of said two centrally-located panels converge toward each other toward said bottom edge of said folding sunshield.

8. The sunshield of claim 1, wherein said long sides of said two centrally-located panels converge toward each other toward said top edge of said folding sunshield.

9. The sunshield of claim 7, wherein each said long side of two or more of said plurality of panels, except for said centrally-located panels, converge upwardly toward its respective opposing side of its respective panel.

10. The sunshield of claim 1 wherein the width of each of said panels, along said top edge of said sunshield, are approximately equal to each other, but are substantially less than the width of each of said panels along said bottom edge of said sunshield.

11. The sunshield of claim 1 wherein the width along each top edge of said centrally-located panels is substantially less than the width along each top edge of the remainder of said panels and wherein the width along each bottom edge of said panels is substantially the same.

12. The sunshield of claim 1 wherein said sunshield has four corners, and wherein two of said corners are acute angles and two of said corners are obtuse angles, and wherein all of said corners are curved.

13. A folding sunshield having a top edge and a bottom edge, a plurality of fold lines in said sunshield extending from said top edge to said bottom edge, wherein each adjacent pair of said fold lines forms a panel in said sunshield, a first one of said fold lines disposed along the center line of said sunshield from said top edge to said bottom edge, and wherein a second one of said fold lines lies on one side of said first fold line and forms a first one of said panels therewith and wherein a third one of said fold lines lies on the other side of said fold line and forms a second one of said panels therewith, and wherein each of said first and second panels is substantially narrower along one of said top edge or said bottom edge than each of said other panels along said one of said top edge or said bottom edge, wherein the fold line on each side of a respective panel, except for said first and second panels, all converge upwardly toward the fold line on the other side of said respective panel and wherein said fold lines on each side of said first panel converge downwardly and wherein said fold lines on each side of said second panel converge downwardly.

* * * * *